INTELLIGENCE TRANSMISSION SYSTEM

Filed March 24, 1944 3 Sheets-Sheet 1

INVENTOR.
GORDON L. FREDENDALL,
ALFRED C. SCHROEDER
BY H. S. Grover.
ATTORNEY.

INTELLIGENCE TRANSMISSION SYSTEM

Filed March 24, 1944 3 Sheets-Sheet 2

INVENTOR.
GORDON L. FREDENDALL,
ALFRED C. SCHROEDER
BY
H. S. Grover.
ATTORNEY.

INTELLIGENCE TRANSMISSION SYSTEM

INVENTOR.
GORDON L. FREDENDALL,
ALFRED C. SCHROEDER
BY
H. S. Grover.
ATTORNEY.

Patented Mar. 28, 1950 2,502,213

UNITED STATES PATENT OFFICE 2,502,213

INTELLIGENCE TRANSMISSION SYSTEM

Gordon L. Fredendall and Alfred C. Schroeder, Feasterville, Pa., assignors to Radio Corporation of America, a corporation of Delaware Application March 24, 1944, Serial No. 527,920

3 Claims. (Cl. 178—5.8)

The present invention relates to intelligence transmission systems and apparatus, and more particularly to television systems in which intelligence signals, such as sound signals, for example, are transmitted along with image signals on a single carrier for reception by single channel carrier current or radio receivers.

According to the invention, a signal representing sound, which is to accompany visual entertainment such as a television program, is transmitted in a novel manner along with the signal representing the visual information. In the invention in a preferred form, signals of varying frequency representing continuous sound are alternated with the intermittent image signals. The time intervals between the intermittent image signals are generally provided by the retrace of the unilateral scanners at the transmitters and receivers, and these time intervals are occupied by synchronizing signals for each field or frame of the transmitted image or view. These synchronizing signals, in the preferred form of the invention, occuring during this flyback time are followed by varying frequency signals representing sound. The association of the synchronizing signals and the signals of varying frequency is such that the synchronizing signals are unmodified or are substantially unmodified.

The principal object of the invention is to provide a novel and improved method of and apparatus for the transmission of video signals, suitable sync or control signals, and sound signals as modulations of a single radio carrier.

Another object of the present invention is to provide for the transmission of sound signals on a pulse carrier in a novel manner.

A still further object of the present invention is to provide for the introduction of frequency modulated signals in a novel manner between trains or series of video signals at a television transmitter.

A still further object of the present invention is to separate frequency modulated audio signals in a novel manner from an image signal carrier and to produce sound from these separated signals.

Other and more specific objects of the invention will become apparent from a consideration of the following specification and claims in connection with the accompanying drawings illustrating one preferred form of the invention, in which:

Figure 2:
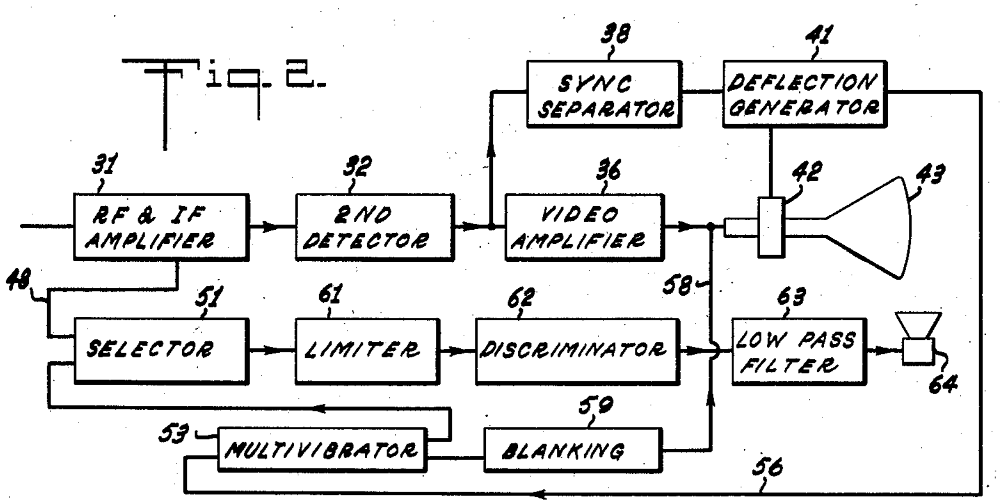
Fig. 2 illustrates in a similar manner a suitable arrangement for receiving apparatus embodying the invention.
Figure 4:
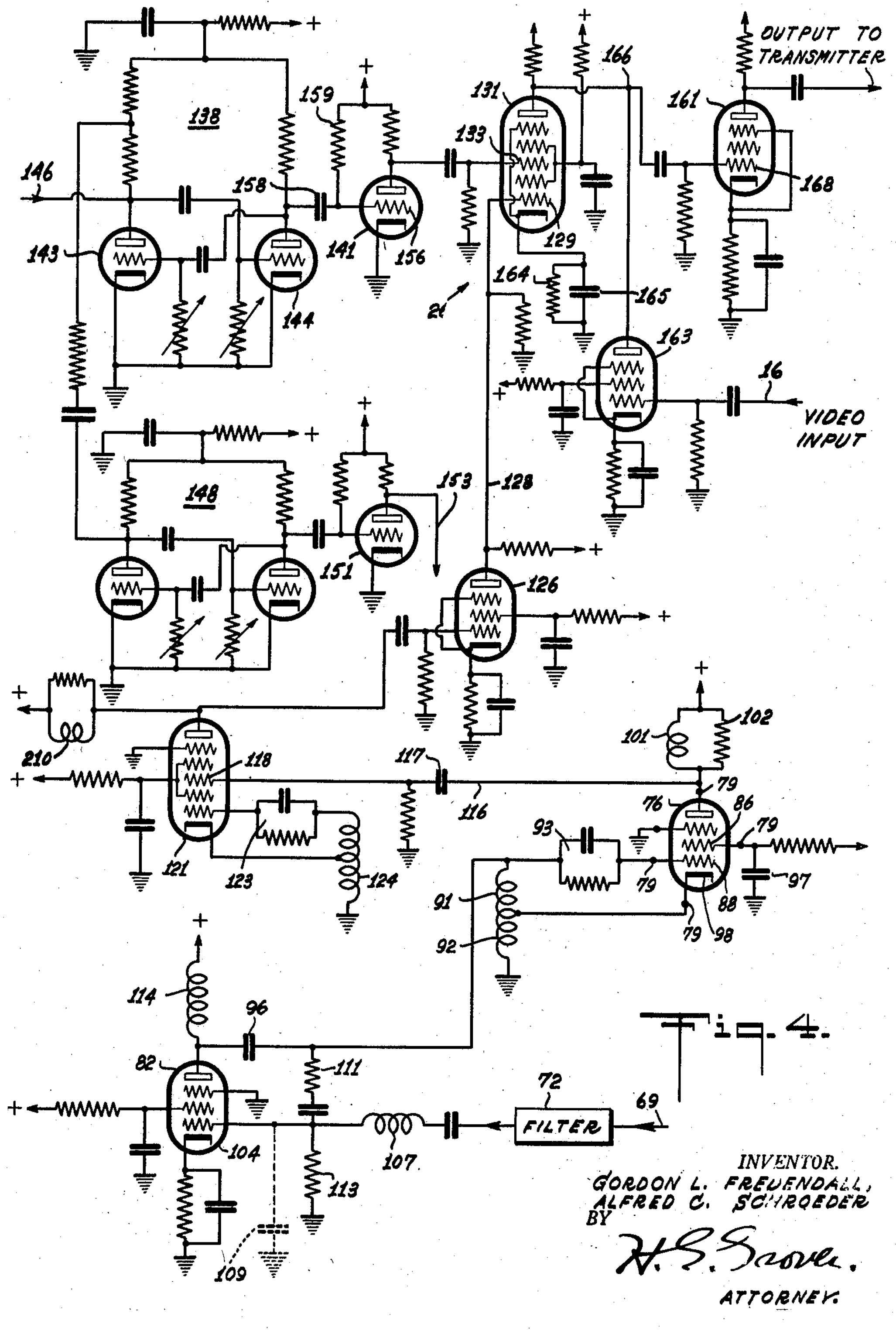
Figure 6:
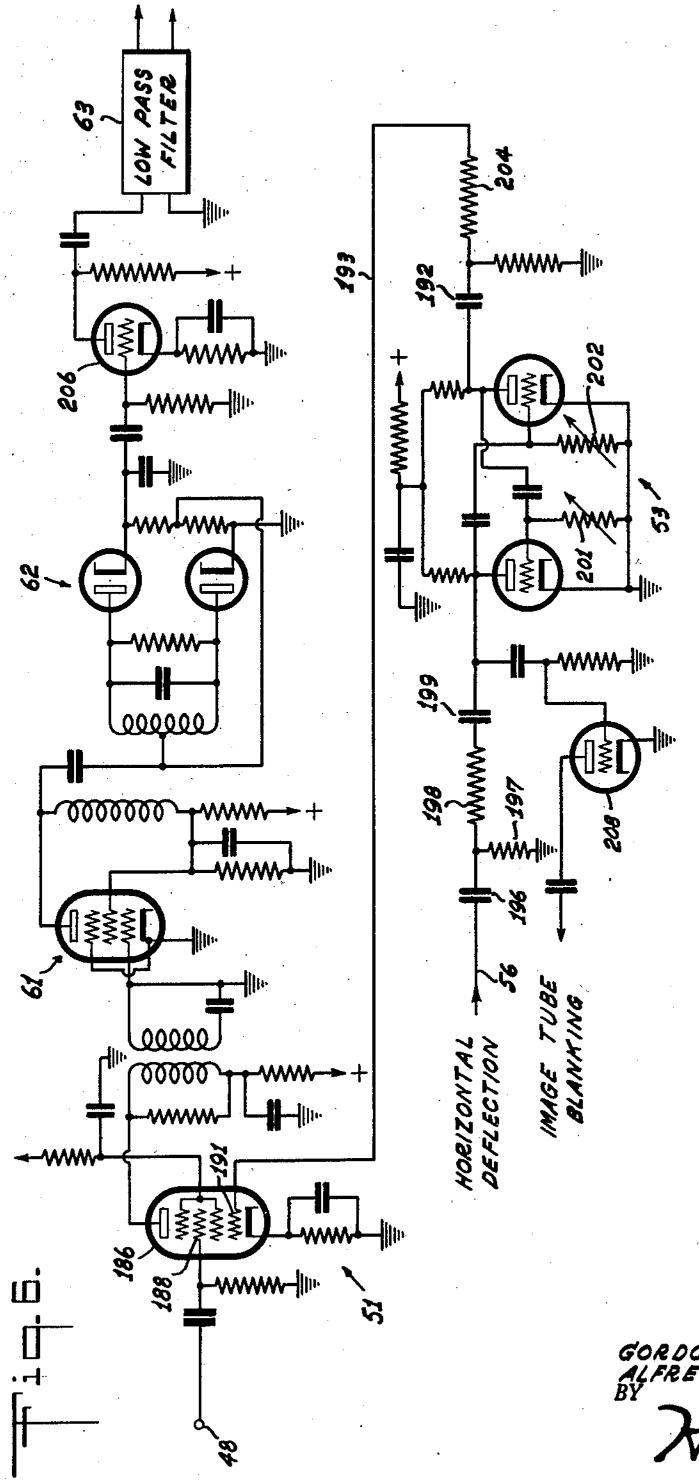
Figures 5, 5A:
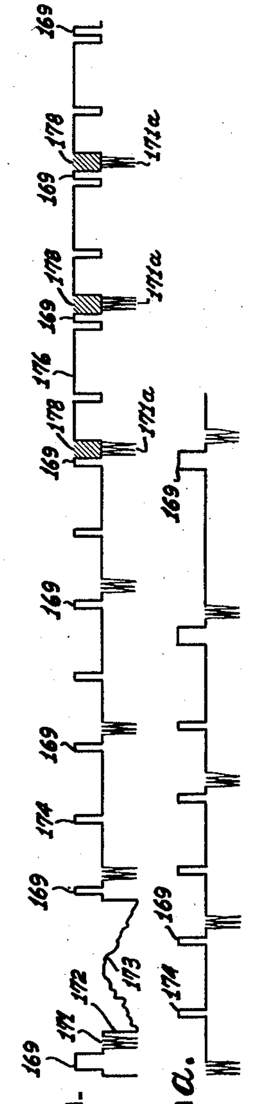

Fig. 4 affords a more detailed illustration of the principal parts of the transmitting apparatus;

Fig. 5 and 5*a* illustrate the combined video or image and audio or sound signal; and Fig. 6 affords a more detailed illustration of portions of the receiving apparatus shown generally and diagrammatically in Fig. 2 of the drawings.

Figure 1:
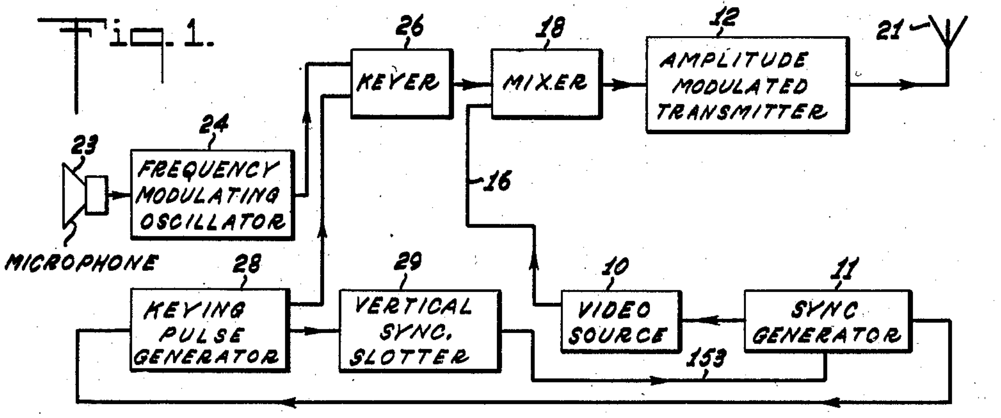
Fig. 1 illustrates conventionally in block diagram form a suitable arrangement for a transmitter embodying the present invention.

Referring to Fig. 1 of the drawings, reference numeral 10 indicates a video signal source and its associated equipment for generating image or video signals according to well known principles of operation. The video signal source 10 may include a cathode ray camera or transmitter scanning tube of well known design, such, for example, as an "Iconoscope" or an "Orthicon." It is also to be understood that any form of mechanical scanning system may be used for producing image or video signals provided that a time interval occurs between trains of electrical signals representing scanned portions of the subject. For example, the generation of television signals may be carried out in the manner disclosed in a patent to Bedfard, 2,192,121, granted February 27, 1940. A suitable synchronizing arrangement is shown in a patent to Seeley, 2,256,530, granted September 23, 1941. Smith Patents 2,132,654 and 2,132,655, both granted October 11, 1938, show scanning control generators which may be employed with a camera, transmitter, or scanning tube. These patents are mentioned solely because of the fact that they illustrate one suitable form of a cathode ray scanning system.

Preferably, in practicing this invention, the time interval referred to above is provided by a slight time separation between the production of the series of electrical signals representing successive lines or elemental strips of the subject. If, for example, it is assumed that the subject being analyzed is scanned over its entire area at a repetition rate of 30 complete frames per second and that an odd line double interlacing method of scanning is employed so that each image field is formed in 262½ lines, the line frequency will be 15,750 lines per second. The entire time required to scan each elemental strip or line of the subject matter will be of the order of $1/15,750$ of a second (about 65 microseconds), and approximately $\frac{1}{10}$ of this total time is occupied by the retrace or flyback of the scanning beam. This portion of the time allotted to the scanning of each elemental strip may, it is understood, be varied within wide limits and may be made to conform to any standard which may be set up for commercial or other reasons. It will be understood that a complete frame may be scanned at one time without resorting to interlaced scanning or that even line interlaced scanning may be employed. Higher fidelity sound can be obtained by increasing the number of scanning lines so that the number of intervals of transmission of sound energy per picture field, assuming the same field repetition rate, will be higher, thus with vertical line scanning the upper frequency register of the transmitted sound would be increased in the illustrative example from approximately 7 kilocycles to approximately 10 kilocycles.

The television scanning device included in the video signal source 10 is operated to test or analyze the varying intensities of light and shadow on each elemental area of the subject, and if it is assumed that the device 10 is a cathode ray tube of the same type shown by the above noted Bedford patent and others, this tube may operate under the control of a horizontal synchronizing signal and a vertical synchronizing or framing signal each of which generally is effectively of saw tooth wave form. This saw tooth wave form is adapted to control the deflecting fields governing the motion or deflection of the cathode ray within the scanning device 10. The synchronizing generator 11 is the source of these saw tooth deflecting currents or voltages. It will be understood that a master pulse generator of any known or desired type is incorporated in the synchronizing signal generator 11 and synchronizes the deflecting operation. In the illustrative example the horizontal synchronizing source will provide a frequency of 15,700 cycles per second (assuming a 525 line scanning of each image frame) and the vertical synchronizing source will provide a frequency of 60 cycles per second. Special provisions for interlacing, if it is employed as suggested, may be provided in manner known in the art. The synchronizing signal generator 11 may serve to provide a blanking bias in a well known manner (not shown) so as to cut off transmission from the video signal source 10 during the horizontal and vertical retrace or blanking periods.

It will be understood by those skilled in the art that the video signal source 10 combines the horizontal and vertical synchronizing control pulses and the image signal variations and shapes the combined resultant wave or composite signal for application to an amplitude modulated transmitter 12. The connection 16 from the video signal source 10 to the transmitter 12 includes a mixer 18 for combining the sound modulated signals with the composite video signal in a manner to be described more in detail hereinafter.

The resulting modulated carrier frequency may be transmitted by way of a radio antenna 21. If desired, transmission may be in accordance with the vestigial side band method disclosed in Patent No. 2,300,501 to Grundmann, granted November 3, 1942. The communication channel herein is indicated as a radio channel although a wire or cable connecting link to the receiving points or stations is equally suitable.

The speech or other audible signals, which accompany the pictorial representation transmitted by the television scanner in the video signal source 10, are caused to influence the sound signal device shown conventionally as a microphone 23.

The audio signal from the microphone is supplied to a frequency modulating oscillator 24. The frequency modulated output from the oscillator 24 is supplied to the mixer 18 under control of a keyer 26 and is combined with the composite video signal in the mixer 18. The details of the operation of the keyer, which is controlled by a keying pulse generator 28, will be described more in detail hereinafter in connection with Fig. 4 of the drawings. The keying pulse generator 28 controls a vertical synchronizing slotter 29 which makes provision for adding the sound modulated signal during the vertical synchronizing operation by carrying the signal level in the negative direction during the time in which a discrete portion of the sound signal is to be added to the composite signal by the mixer 18. The signal representing sound is added during the horizontal blanking intervals by its addition directly to the video signal without substantially altering the customary synchronizing pulses.

Fig. 2 of the drawings shows diagrammatically the equipment of a typical receiver which may be employed for receiving image and sound signals radiated by the transmitter 12 of Fig. 1. As the received energy includes sound, synchronizing and video or image signals, it is desirable that these signals be appropriately separated one from the other. The synchronizing signals are separated from the video signals in any well known manner which may be either by wave form selection, by amplitude selection, or by frequency discrimination. The receiver of Fig. 2 is illustrated as being of the usual superheterodyne type having a radio frequency and intermediate frequency amplifier 31. The output from the amplifier 31 is passed to a second detector 32 which recovers the composite signal shown in Figs. 5 and 5*a* and applies it to a video amplifier 36 and a synchronizing signal separator 38. Signal separation is accomplished in the synchronizing signal separator 38, and control signals are supplied from this separator to the deflection generator 41. Horizontal and vertical sweep frequencies of appropriate wave form are applied to the deflection system 42 of an image producing device such as a fluorescent screen cathode ray tube 43. The video signals are supplied to the tube 43 from the output circuit of the video amplifier 36 which is also connected to the second detector 32.

The vertical synchronizing signal is adapted to control the position at which the electro-optical effects in the tube 43 are produced, and it with the blanking signal also serves to render the video signal amplifier 36 or the tube 43, or both as desired, inoperative during the return line. Similarly, the horizontal synchronizing system which controls the line scanning the line scanning rate is adapted along with the horizontal blanking signal to render either the image signal amplifier 36 or the image tube 43 inoperative during the return line or retrace period between the reproduction of successive elemental strips of the image. This type of control is well known and does not constitute a part of the present invention except insofar as it cooperates with the general combination of the various other elements to include novel subject matter.

The receiver equipment thus far described may be of any type chosen to receive video signals from the transmitter of Fig. 1. The sound receiving and reproducing arrangements in accordance with the invention, now to be briefly described, are added without disturbing the usual function of the electro-optical image producing equipment.

One arrangement in accordance with the invention for effecting the recovery of the frequency modulated sound signal and its conversion to audible sound effects is shown diagrammatically in Fig. 2. The intermediate frequency output of the amplifier 31 is fed by way of a connection 48 to a selector 51. Video and synchronizing signals as well as the frequency modulated sound signals appear as modulations of the intermediate frequency in the connection 48 and therefore the function of the selector is to select the intervals of frequency modulated sound from the intermediate frequency signal. Operation of the selector 51 is controlled by a frequency generator, such as a multivibrator 53, which is shown as being controlled, in turn, from the deflection generator 41 by way of a connection 56. A blanking signal is applied to the image producing tube 43 by way of a connection 58 from a blanking signal generator 59. The blanking signal generator may conveniently be controlled from the multivibrator 53.

The selector 51 passes only the portions of the video intermediate frequency signal containing the frequency modulated sound signal intervals to a limiter 61 and a discriminator 62. The output from the discriminator 62, which is in form of amplitude modulated pulses representing sound, is passed through a low pass filter 63 to a sound reproducer such as a loudspeaker 64. The filter preferably is designed so that it will considerably attenuate frequencies higher than half of the horizontal synchronizing frequency and serves to pass only the frequency components lying within the range of the sound frequencies impressed on the microphone 23 (Fig. 1). The characteristics of the filters 63 and 72 (Fig. 4) are preferably similar.

Figure 3:
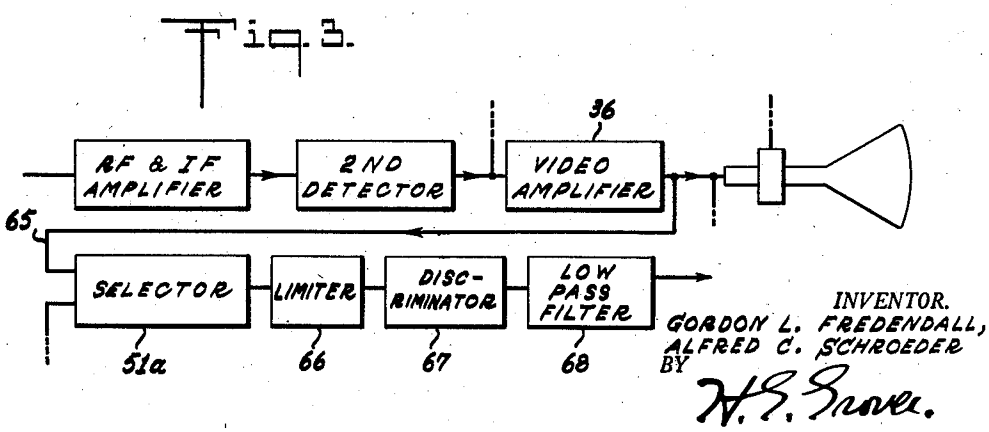
Fig. 3 shows a slight modification in Fig. 2.

Another arrangement for effecting recovery of the frequency modulated sound signal and its conversion to audible sound effects is shown diagrammatically in Fig. 3 of the drawings in which portions of the apparatus similar to Fig. 2 are omitted for the sake of convenience. The video signal from the video signal amplifier 36 is fed to the selector 51*a* by way of a connection 65. The selector 51*a*, which is similar to the selector 51 to be described more in detail hereinafter, passes the video signal to a limiter 66 and a discriminator 67. The limiter and discriminator of Fig. 3 operate at the frequency of the center frequency produced by the oscillator 24 of Fig. 1 of the drawings. The output of the discriminator 67 is applied to the sound reproducer 64 by way of a low pass filter 68.

A more detailed description of the sound reproducing arrangements and their operation, shown diagrammatically by Figs. 2 and 3 of the drawings will be given following the detailed description of the sound pickup system of Fig. 1 and it operation and particularly by the description of Fig. 6 and its operation.

Referring now to Fig. 4 of the drawings which shows a specific embodiment of the sound signal channel according to the invention, the input connection from a microphone, such as the microphone 23 of Fig. 1, is indicated at 69. The connection between the microphone and the point 69 may, it will be understood, include an amplifier or amplifiers and also the low pass filter 72. The filter 72 should cut off at approximately one half of the line frequency which may, in accordance with the example given above, be 7,875 cycles per second. The audio input applied to the connection 69 modulates an oscillator comprising circuits associated with a vacuum tube 76.

This tube 76 and other tubes employed in the apparatus shown in the drawings are, it is understood, provided with the usual means 79, such as the connecting pins or the like on the vacuum tube base which cooperate with a tube socket, for connecting the terminals of the circuit elements to the elements contained in the vacuum tube.

The oscillator tube 76 in combination with a tube 82, which operates as a reactance tube, provides the output which is frequency modulated by the sound signal appearing at the sound input terminal 69. The manner in which the reactance tube 82 functions to vary frequency of the oscillator 76 will appear from the following description of the oscillator and its function.

The electrode 86 of the tube 76 serves as the plate of the portion of the tube which functions as an oscillator; and the grid 88 serves as the oscillator grid. Closely coupled coils 91 and 92, which may in accordance with usual practice be combined together in a tapped coil, in conjunction with a grid leak and condenser combination 93, cause oscillations to be generated of a frequency determined by a condenser 96 which is effectively in series with the capacity furnished by the reactance tube 82. A capacitance 97 serves as a bypass between the electrode 86 and the cathode 98 at the frequency of the generated oscillations. A damped tuned circuit composed of an inductance 101 and a resistance 102 serves as a plate load and increases the voltage output from the tube 76.

The grid 104 of the reactance tube 82 is connected to the audio signal source, which, in the example given, comprises the filter 72, through an inductance 107 which serves as a choke. Oscillations from the oscillator portion of the tube 76 are fed to the grid 104 through a capacitance and resistor combination 111. A leak resistor 113 in combination with the input capacitance 109 of the tube 82 determines the phase of the voltage fed back to the grid 104. The plate load for the tube 82 is in the form of a choke 114 which serves to keep the high frequency oscillations out of the plate voltage source. The audio source varies the frequency of the oscillator 76 by varying the oscillator tuning capacity which is provided in part by the tube 82. The magnitude of the effective inductive reactance of the tube varies in accordance with the frequency of the amplitude variations from the audio modulating source.

The frequency modulated output of the frequency modulated oscillator 76, appearing in a connection 116, is applied by way of a coupling condenser 117 to the grid 118 of a relatively fixed frequency oscillator 121. The frequency generated by the oscillator 121 differs from the frequency generated by the oscillator 76 by the value of the desired frequency modulated carrier. For example, the center frequency of the oscillator 76 may be set at 50 megacycles and the frequency of the oscillator 121 may be set at 52 megacycles so that the center frequency of the frequency modulated carrier for the derived sound signals will be 2 megacycles. The circuits which are associated with the electrodes of the oscillator tube 121 are or may be similar to those employed in connection with the tube 76 and comprise a grid leak and condenser 123 and a tapped inductance 124. Only the instantaneous difference frequency of oscillators 121 and 76 is used subsequently. Thus, inductance 210 together with the total distributed capacitance of tubes and circuits effective across 210 are resonated at the said difference frequency. This difference frequency is amplified in an amplifier tube 126 of any desired type connected in any manner suitable for amplifying a wide band high frequency input substantially without distortion.

The amplified frequency modulated carrier appearing in the output connection 128 of the amplifier 126 is applied to one of the grids 129 of a tube 131 which functions in connection with its associated circuits as the keyer 26 of Fig. 1 of the drawings. The reference character 26 is therefore applied in Fig. 4 to indicate the keyer in its entirety.

The keyer tube 131 operates to pass the frequency modulated sound signal to the transmitter output at appropriate times under the control of biasing pulses applied to another of its grids 133. The manner of obtaining and timing these pulses will now be described in detail.

The keying pulse generator 28 (Fig. 1) may, for example, comprise a multivibrator 138 (Fig. 4) and a delayed pulse generator shown as a vacuum tube 141 and its associated circuits. The multivibrator 138 is of the usual type comprising two tubes 143 and 144. The output of this multivibrator is locked in with the horizontal driving impulses and they are provided by way of a connection 146 (Figs. 1 and 4). Impulses employed to interrupt continuity of the vertical synchronizing pulse, as will be explained in connection with Figs. 5 and 5$a$, are derived from the vertical synchronizing pulse slotter indicated by reference character 29 on Fig. 1 and shown more in detail by Fig. 4 as comprising a multivibrator 148 and a delayed pulse generator comprising a vacuum tube 151 and its associated circuits. The tube 151 is operated in substantially the same manner as the tube 141. The output connection 153 from the tube 151 is shown as being connected to the synchronizing generator 11.

The output from the multivibrator 138 is applied to the grid 156 of the tube 141 by way of a capacitance 158. A relatively high positive bias is applied to the grid 156 by way of a grid resistor 159. The duration of the pulse applied to the grid 133 of the keyer tube 131 is determined by the capacitance and resistance of the elements 158 and 159. The positive bias on the grid of the tube 141 causes it to draw grid current until it biases itself off. The voltage drop in the grid resistor takes up the positive bias applied from the battery. The pulse output of the tube 141 is initiated from the pulse output of the multivibrator 138. This arrangement for obtaining time delay and width control of a pulse is disclosed in a patent to Karl R. Wendt, No. 2,313,906, issued March 16, 1943.

The pulse from the tube 141 is, as previously stated, applied to the grid 133 of the tube 131 as a positive bias and causes this tube to become conductive at a time after the horizontal synchronizing pulse has ceased. The frequency modulated sound carrier from the amplifier 126 is therefore transmitted to the amplifier tube 161, which serves as a mixer for the video signal applied over the connection 16 (Figs. 1 and 4) by way of an amplifier 163 if additional amplification is desirable or necessary. Intervals of frequency modulated sound are added to the video signal at the point 166, and the output of the amplifier 161 containing both video and sound signals is applied to the amplitude modulated transmitter 12 for radiation. A cathode resistor 164 and a condenser 165 serves to bias the tube 131 off during transmission of image signals to the point 166 so that there is no current in its plate circuit.

The wave form of the signal appearing at the control grid 168 of the amplifier tube 161 is shown in Figs. 5 and 5$a$ of the drawings. The horizontal synchronizing pulses, indicated by the reference character 169, occur at regular intervals effectively without interruption, and the keyer 26 adds the frequency modulated sound signal indicated by reference character 171 after the occurrence of each horizontal synchronizing pulse and for the interval of time determined by the operation of the tube 141 as explained previously. The addition of the frequency modulated sound pulses shapes the wave form of the signal as shown in Figs. 5 and 5$a$ without any necessity for additional apparatus for slotting the wave form at the time of transmission of the sound signal or changing the blanking level. The adjustment of the tube 141 is such that the termination of the blanking period is sharply defined in the usual manner by the end 172 of the blanking interval. The image signal variations are indicated at 173 and contain the intelligence necessary to recreate the image at a receiver. A vertical synchronizing blanking interval is shown by way of example, and it includes horizontal synchronizing pulses 169 and equalizing pulses 174 in the usual manner. The vertical synchronizing pulse 176 is slotted by the action of the vertical synchronizing signal slotter 148 and the time delayed pulse generating tube 151. The slots which are produced in this manner are indicated by reference character 178 and extend only to the blanking level as indicated by the crosshatching of these slots on the drawing. These slots are produced in proper time relationship with respect to the complete signal by means of the delay after the normal synchronizing period produced by the tube 151. At the time of production of these slots, the tube 141 causes the keyer 26 to be active and to add the frequency modulated sound signals 171$a$ to the video signal.

It will be seen that the transmission of sound is essentially the result of transmitting a frequency modulated wave at intervals determined by the frequency of horizontal driving. The timing of these intervals of transmitted sound is, because of the manner of transmission employed, not especially critical since the beginning of the interval may occur at a varying time after the synchronizing pulse 168 ceases and is to end slightly ahead of the end 172 of the blanking interval. This time relationship with respect to the horizontal synchronizing pulses and equalizing pulses in the vertical blanking region is also maintained.

As stated above and as is apparent from an inspection of either Fig. 2 or Fig. 3, the portion of the television receiver employed to receive signals transmitted from the antenna 21 of Fig. 1 and to recreate the image scanned by the television scanner 10 is or may be of any well known type without departing from the spirit of the invention. The sound signal apparatus added to the image receiver in accordance with Fig. 2 of the drawings will now be described more in detail with reference to Fig. 6.

A vacuum tube 186, forming the principal part of the selector device 51 (Fig. 2), serves to connect the sound signal channel with the sound reproducer at the proper time intervals so that the video signal will not cause interference in the sound channel. The video signal containing the synchronizing pulses and the frequency modulated sound intervals 171 and 171a is applied to the control grid 188 of the tube 186 by way of the connection 48 which may receive energy from the plate circuit of the intermediate frequency amplifier 31 or the plate circuit of the video amplifier 46 as shown in Fig. 3 of the drawings. The tube 186 is biased off by a biasing potential applied to its grid 191 from the multivibrator 53 by way of a coupling condenser 192 and a connection 193.

The multivibrator 53, which may be of any desired type, is synchronized by a signal obtained from the horizontal deflection circuit for the image producing tube 43 by way of a connection 56 as mentioned above. While this controlling pulse or wave source is indicated for convenience, pulses of any kind from the deflection generator 41 may be employed. The output from the multivibrator 53 occurs in timed relationship with the sound signal intervals being received so that the tube 186 is conducting only during these intervals. This result is accomplished by appropriately choosing the circuit constants of elements 196, 197, 198, and 199 as well as by suitably adjusting controls 201 and 202 of the multivibrator. The control 201 of the multivibrator is a variable grid leak which determines the speed at which the multivibrator runs or its frequency, and hence this is the control used for synchronizing the multivibrator. The width of the selecting interval is controlled by the adjustable grid lead 202 and determines the time that the tube 186 is conductive. The capacitance 196 together with the resistance 197 in combination with the resistance 198 and the capacitance 199, together with the setting of the adjustable grid leak 201, determines the timing of the multivibrator 53. The capacitance 196 and the resistor 197 serve as a differentiating circuit to produce control pulses which are in step with the horizontal deflection pulses, but these pulses obtained by differentiation occur slightly later than the horizontal synchronizing pulses. One method of obtaining the time occurrence of these differentiation pulses has been indicated in the foreground, mainly to employ the saw tooth horizontal deflection wave applied by way of the connection 56 inasmuch as each sloping portion of this wave starts following the occurrence of a horizontal synchronizing pulse. The resistor 198 serves the additional purpose of keeping multivibrator oscillations out of the receiver circuits.

A resistor 204 in the connection 193 provides for wave shaping of the grid biasing pulse from the multivibrator when the tube 186 draws grid current at its grid 191.

The selector 51 is coupled to the limiter 61 which in turn is connected to the discriminator 62 as stated above. The limiter and discriminator are of any well known type and perform the function usually performed in such equipment as a frequency modulated sound receiver. The limiter and discriminator are tuned to the rest or center frequency of the frequency modulated pulses i. e. the difference frequency of oscillators 76 and 121, Fig. 4, or to the difference between the corresponding intermediate frequency generated in the receiver depending whether the connections are as shown in Fig. 3 or Fig. 2.

The output from the discriminator is shown in Fig. 6 as being amplified by an amplifier 206 before being applied to the filter 63.

The blanking pulse derived from the multivibrator 53 is amplified in a tube 208 and is applied to the image producing tube 43 by way of the connection 58 to insure blanking of the image reproducing tube during the sound transmission time. The tube 208 may, it is understood, be substituted for the blanking signal generator represented by reference character 59 in Fig. 2 of the drawings. The blanking signal from the tube 208 is preferably applied to the cathode of the image reproducing tube and may be in addition to or may be substituted for the usual blanking connections.

Various alterations and modifications may be made in the present invention without departing from the spirit and scope thereof, and it is desired that any and all such modifications be considered within the purview of the present invention as defined by the hereinafter appended claims.

Having now described the invention, what is claimed and desired to be secured by Letters Patent is the following:

1. Apparatus for receiving video and sound signals multiplexed on a single carrier comprising an image producing device, a local pulse source, a relay device, means to supply a biasing potential to said relay device to produce a cut off condition in said device under control of said local pulse source, means periodically to render said image producing device inoperative under control of said local pulse source, means to supply a frequency modulated wave to said relay device for transmission thereby during time intervals when said device is operative, means for limiting the amplitude of said received wave, means for converting frequency variations of said wave into amplitude variations, and means for translating said amplitude variations into audible effects.

2. Apparatus for receiving video and sound signals multiplexed on a single carrier comprising an image producing device, a vacuum tube relay associated with said apparatus, a local pulse source, means to supply a relay cut off biasing potential, means to connect said bias supply means to the vacuum tube relay, means periodically to render said image producing device inoperative under control of said local pulse source, means to connect a source of signal modulated wave trains to the relay device for transmission thereby during the time intervals when said relay device is operative, an output circuit, means for connecting said output circuit to the vacuum tube relay, means for converting frequency variations of said wave into amplitude variations and means for translating said amplitude variations into audible effects.

3. In a signalling system the method of transmitting simultaneously occurring signals of different kinds upon a single carrier frequency which comprises producing intelligence signal trains variable in amplitude between lower and upper limits, producing additional intelligence signals of a different kind, producing oscillations and varying the frequency of said oscillations in accordance with variations in said different kind of intelligence signals, producing other oscillations and obtaining a beat frequency varying in frequency in accordance with the frequency variations of said first named oscillations, producing a carrier wave, and modulating said carrier wave by an intelligence signal train and a frequency varying signal, and successively and cyclically repeating the modulating process.

GORDON L. FREDENDALL.
ALFRED C. SCHROEDER.

REFERENCES CITED

The following references are of record in the file of this patent:

UNITED STATES PATENTS

| Number | Name | Date |
|---|---|---|
| 2,075,071 | Usselman | Mar. 30, 1937 |
| 2,089,639 | Bedford | Aug. 10, 1937 |
| 2,227,108 | Roosenstein | Dec. 31, 1940 |
| 2,254,435 | Loughren | Sept. 2, 1941 |
| 2,296,919 | Goldstine | Sept. 29, 1942 |
| 2,326,515 | Bartelink | Aug. 10, 1943 |
| 2,350,902 | Kallmann | June 6, 1944 |
| 2,391,776 | Fredendall | Dec. 25, 1945 |